US008946636B2

(12) United States Patent
Afrooze et al.

(10) Patent No.: US 8,946,636 B2
(45) Date of Patent: Feb. 3, 2015

(54) METHOD AND APPARATUS FOR GENERATING AN INFRARED ILLUMINATION BEAM WITH A VARIABLE ILLUMINATION PATTERN

(71) Applicant: Avigilon Corporation, Vancouver (CA)

(72) Inventors: Sina Afrooze, Vancouver (CA); Michael Neufeld, Vancouver (CA); Guoqian Sun, Vancouver (CA); Piotr Celler, North Vancouver (CA); Colin Janssen, New Westminster (CA); Jeremy Hale, Nanaimo (CA); Frederick Ramsay, Vancouver (CA)

(73) Assignee: Avigilon Corporation, Vancouver (CA)

( * ) Notice: Subject to any disclaimer, the term of this patent is extended or adjusted under 35 U.S.C. 154(b) by 10 days.

(21) Appl. No.: 13/752,291

(22) Filed: Jan. 28, 2013

(65) Prior Publication Data

US 2014/0197314 A1 Jul. 17, 2014

Related U.S. Application Data

(60) Provisional application No. 61/752,905, filed on Jan. 15, 2013.

(51) Int. Cl.

| | |
|---|---|
| ***F21V 9/16*** | (2006.01) |
| ***G01J 5/00*** | (2006.01) |
| ***H05B 37/02*** | (2006.01) |
| ***G01J 5/10*** | (2006.01) |

(52) U.S. Cl.

CPC .. *H05B 37/02* (2013.01); *G01J 5/10* (2013.01)
USPC ......................... 250/338.1; 396/175; 362/235

(58) Field of Classification Search

CPC ........... G01N 2201/0621; G01N 21/35; F21Y 2101/02
USPC ....................................................... 250/338.1
See application file for complete search history.

(56) References Cited

U.S. PATENT DOCUMENTS

2007/0297184 A1* 12/2007 Isely ............................ 362/382
2009/0278795 A1 11/2009 Hansen et al.
2012/0121244 A1* 5/2012 Stavely ........................ 396/175

FOREIGN PATENT DOCUMENTS

WO WO 2008/017857 A1 2/2008

OTHER PUBLICATIONS

International Search Report dated Sep. 16, 2013, issued by the Canadian Intellectual Property Office in corresponding Canadian PCT Application Serial No. PCT/CA2013/050061, filed Jan. 28, 2013.
Written Opinion dated Sep. 16, 2013, issued by the Canadian Intellectual Property Office in corresponding Canadian PCT Application Serial No. PCT/CA2013/050061, filed Jan. 28, 2013.

* cited by examiner

*Primary Examiner* — David Porta
*Assistant Examiner* — Jeremy S Valentiner
(74) *Attorney, Agent, or Firm* — Klarquist Sparkman, LLP

(57) ABSTRACT

A method for generating an infrared (IR) beam for illuminating a scene to be imaged comprises providing at least two IR emitters, including a first IR emitter operable to emit a wide beam component of the IR beam, and a second IR emitter operable to emit a narrow beam component of the IR beam, wherein the wide beam component has a linear profile that has a lower standard deviation than a linear profile of the narrow beam component. The method also comprises selecting a desired linear profile for the IR beam, and selecting a power ratio of power directed to the first IR emitter and power directed to the second IR emitter that produces the IR beam with the desired linear profile when the narrow beam component and wide beam component are combined; and directing power to the first and second IR emitters at the selected power ratio to generate the wide and narrow beam components, and combining the generated wide and narrow beam components to produce the IR beam.

19 Claims, 6 Drawing Sheets

10
22
SoC
CPU
MAC
GPIO
I2C
ISP
40
42
44
38(a)
38(b)
PWM1
PWM2
I2C
DRIVER
DRIVER
20(a)
20(b)
NARROWBEAM LENSLETS
WIDEBEAM LENSLETS
36
34
18(a)
18(b)
LENS DRIVER
ZOOM LENS
IMAGER
12
14

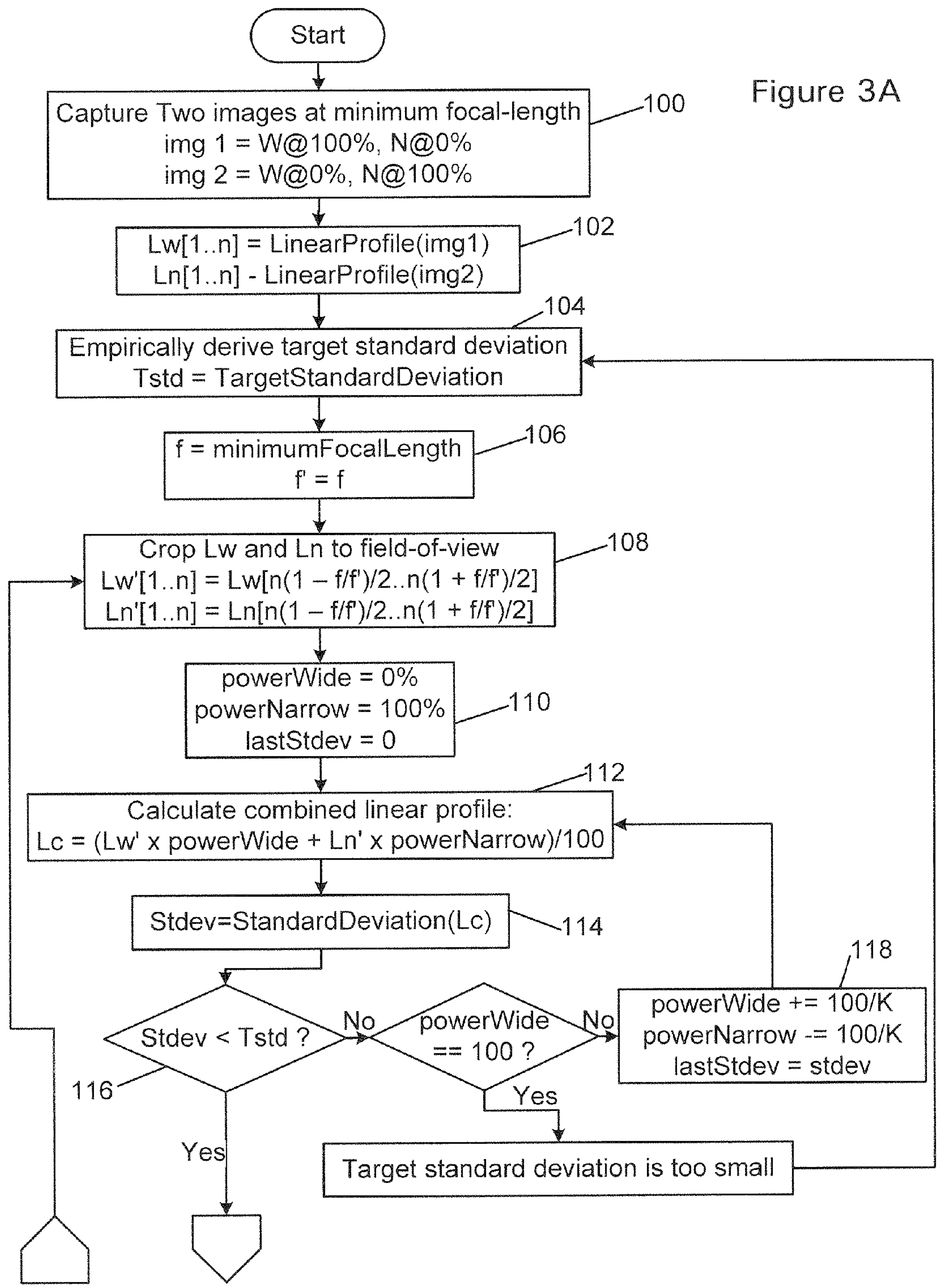
Start
Capture Two images at minimum focal-length
img 1 = W@100%, N@0%
img 2 = W@0%, N@100%
100
Figure 3A
Lw[1..n] = LinearProfile(img1)
Ln[1..n] - LinearProfile(img2)
102
104
Empirically derive target standard deviation
Tstd = TargetStandardDeviation
f = minimumFocalLength
f' = f
106
Crop Lw and Ln to field-of-view
Lw'[1..n] = Lw[n(1 – f/f')/2..n(1 + f/f')/2]
Ln'[1..n] = Ln[n(1 – f/f')/2..n(1 + f/f')/2]
108
powerWide = 0%
powerNarrow = 100%
lastStdev = 0
110
112
Calculate combined linear profile:
Lc = (Lw' x powerWide + Ln' x powerNarrow)/100
Stdev=StandardDeviation(Lc)
114
118
Stdev < Tstd ?
No
powerWide == 100 ?
No
powerWide += 100/K
powerNarrow -= 100/K
lastStdev = stdev
116
Yes
Yes
Target standard deviation is too small Yes
powerWide > 0 ?
No
OptimalPowerWide = 0
121
120
Yes
OptimalPowerWide = powerWide – (100/K) x (Tstd – stdev)/ (lastStdev–stdev)
Save (f', OptimalPowerWide)
122
f' >= maximumFocalLength ?
No
f' += deltaFocalLength
124
Yes
End

METHOD AND APPARATUS FOR GENERATING AN INFRARED ILLUMINATION BEAM WITH A VARIABLE ILLUMINATION PATTERN

CROSS REFERENCE TO RELATED APPLICATION

This application claims the benefit of U.S. Provisional Application No. 61/752,905, filed Jan. 15, 2013, which is incorporated herein in its entirety by reference.

FIELD

This disclosure relates generally to a method for generating an infrared ("IR") illumination beam with a variable illumination pattern, and an IR illuminator for performing such method. Such IR illuminator can be part of an imaging apparatus having a zoom lens, and generate an IR illumination beam with an illumination pattern that varies with the focal length of the zoom lens.

BACKGROUND

Some conventional security or surveillance cameras use varifocal lenses that allow an adjustable field-of-view. When equipped with an IR illuminator, the illumination pattern is fixed for all focal lengths and is generally optimized for a specific field of view at one focal length. For field of views that are larger than the optimized field of view, a non-optimal illumination pattern will appear as a bright spot in the centre of the image, saturating the sensor in that region and obscuring detail. Conversely, for field of views that are narrower than the optimized field of view, some of the illumination power will be projected outside of the imaging area and therefore be wasted. As a result, a less than optimal IR image is captured by surveillance cameras that use such IR illuminators.

SUMMARY

According to one aspect of the invention, there is provided a method for generating an infrared (IR) beam for illuminating a scene to be imaged. The method comprises providing at least two IR emitters, including a first IR emitter operable to emit a wide beam component of the IR beam, and a second IR emitter operable to emit a narrow beam component of the IR beam, wherein the wide beam component has a linear profile with a lower standard deviation than a linear profile of the narrow beam component. The method also comprises selecting a desired linear profile for the IR beam, and selecting a power ratio of power directed to the first IR emitter and power directed to the second IR emitter that produces the IR beam with the desired linear profile when the narrow beam component and wide beam component are combined. The method then comprises producing the IR beam by directing power to the first and second IR emitters at the selected power ratio to generate the wide and narrow beam components and combining the generated wide and narrow beam components. The generated wide and narrow beam components can be combined by directing the centres of the wide and narrow beam components on the same location in the scene. The desired linear profile of the IR beam can be defined as having a standard deviation that is less than or equal to a target standard deviation.

The method can further comprise imaging the scene at a selected focal length, wherein the selected focal length has an associated field of view. The desired linear profile for the selected focal length has a standard deviation that is less than or equal to the target standard deviation and a highest available irradiance within the field of view. The highest available irradiance can be the power ratio having the highest proportion of power directed to second IR emitter and which produces an IR beam with a standard deviation less than or equal to the target standard deviation.

The method can further comprise imaging the scene at different focal lengths each having a respective different field of view, and producing an IR beam with a desired linear profile corresponding to each different focal length. Each desired linear profile has a standard deviation that is less than or equal to the target standard deviation and the highest available irradiance for the field of view associated with the corresponding focal length.

The imaging can be performed by an imaging apparatus having a zoom lens with variable focal lengths, in which case the method comprises determining a current focal length of the zoom lens, selecting the desired linear profile corresponding to the current focal length, producing an IR beam at the desired focal length, and imaging a scene illuminated by the IR beam at the current focal length. Selecting the desired linear profile corresponding to the current focal length can comprise accessing a beam profile-to-focal length map comprising a series of focal length increments and their corresponding desired linear profiles, and selecting the linear profile in the map with a corresponding focal length increment equal to the current focal length.

According to another aspect of the invention, there is provided an apparatus for illuminating a scene to be imaged with infrared radiation, comprising: at least two IR emitters, including a first IR emitter operable to emit a wide beam component of the IR beam, and a second IR emitter operable to emit a narrow beam component of the IR beam, wherein the wide beam component has a linear profile that has a lower standard deviation than a linear profile of the narrow beam component; at least two current drivers, including a first current driver coupled to the first IR emitter, and a second current driver coupled to the second IR emitter; and processing circuitry communicative with the current drivers to instruct each current driver to deliver a selected amount of power to the coupled IR emitter. The processing circuitry comprises a processor and a memory having encoded thereon program code executable by the processor to perform the aforementioned method for generating an infrared (IR) beam for illuminating a scene to be imaged. The first and second IR emitters can be aligned such that the wide and narrow beam components are directed at the same location in the scene.

The apparatus can further comprise an imager communicative with the processing circuitry, a zoom lens having variable focal lengths and being optically coupled to the imager, and a lens driver communicative with the zoom lens and the processing circuitry. The memory can further comprise a beam profile-to-focal length map comprising a series of focal length increments of the zoom lens and their corresponding desired linear profiles.

BRIEF DESCRIPTION OF THE DRAWINGS

FIGS. 3A and 3B are a flow chart showing steps performed by a program for generating an IR beam with a linear profile that varies with focal length of a zoom lens of the security camera.

DETAILED DESCRIPTION

Figure 1:
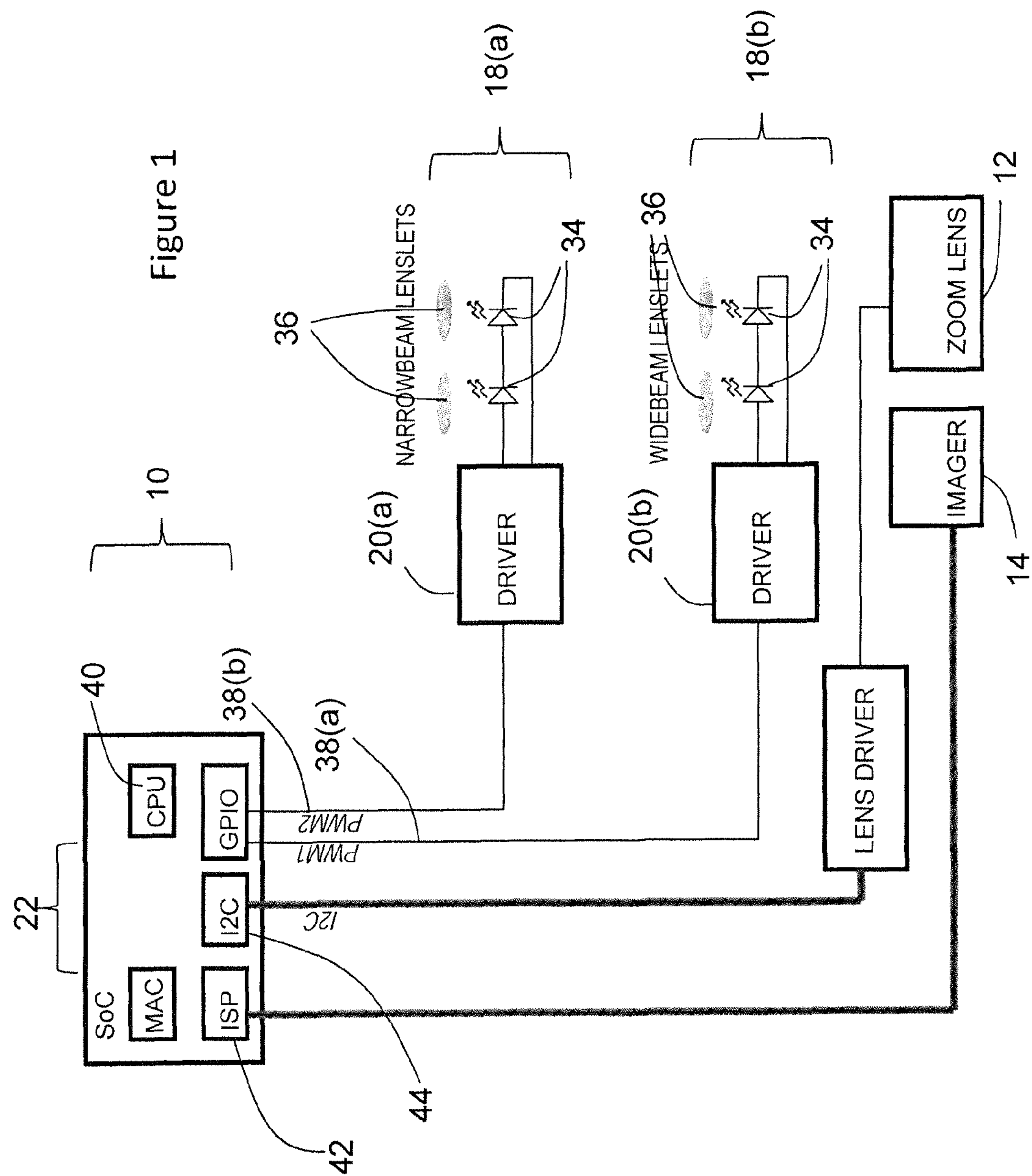
FIG. 1 is a schematic block diagram of components of an imaging apparatus with a zoom adaptive IR beam according to one embodiment of the invention.

Embodiments of the invention described herein relate to a variable IR illuminator apparatus and method for generating an IR beam used to illuminate a scene to be imaged, wherein the IR beam has an illumination pattern with a linear profile that can be varied. In this description, "illumination pattern" refers to the two-dimensional irradiance distribution of the IR beam in the scene, and "linear profile" refers to the irradiance distribution of the IR beam along a selected line through the centre of the illumination pattern. Typically, an IR beam is radially symmetrical in which case the linear profile will define the characteristics of the illumination pattern. Such a variable IR beam can be used in an imaging apparatus such as a security camera which comprises a varifocal (zoom) lens with a variable focal length (zoom). The variable IR illuminator can be part of the imaging apparatus and be used to vary the linear profile of an IR beam on a scene captured by the imaging apparatus. The imaging apparatus includes a processor with a memory having encoded thereon program code executable by the processor to vary the linear profile of the IR beam as the focal length of the zoom lens is varied. The linear profile of the IR beam at a given focal length can be selected to provide improved uniformity and/or improved irradiance of the IR beam at that focal length, when compared to an IR illuminator that produces an illumination pattern having the same linear profile for all focal lengths.

Having an IR beam with a linear profile that can vary with the focal length of the zoom lens is beneficial because as a zoom lens zooms in (i.e. the focal length lengthens), the field of view of a captured image is reduced. To maximize the signal-to-noise ratio of the captured image, as much of the IR illumination beam's power should be directed into the field of view as evenly as possible at any given focal length. However, an IR beam with a fixed illumination pattern (i.e. a beam with a non-varying linear profile) can only be optimized for the field of view at one particular focal length; this results in substantial parts of the IR beam being projected outside the field of view at focal lengths that are longer than the optimized focal length and an IR beam that is uneven with a bright spot at the centre of the image at focal lengths that are shorter than the optimized focal length. As will be described in detail below, in embodiments of the imaging apparatus described herein, the variable IR illuminator comprises at least two IR emitters which each produce an IR beam of different linear profiles, and which can be combined at different power ratios to generate an IR beam of different linear profiles; this enables the imaging apparatus to select an IR beam with a linear profile that is particularly suited to a particular focal length of the zoom lens. A particularly suited linear profile is one which meets or is below a target standard deviation and/or meets or exceeds a target irradiance.

Referring now to FIG. 1, an imaging apparatus 10 according to one embodiment comprises the following major components: a zoom lens 12, an imager 14 optically coupled to the zoom lens 12, a lens driver 16 mechanically coupled to the zoom lens 12 and operable to change the focal length of the zoom lens, an IR illuminator 18 comprising a pair of IR emitters 18(*a*), 18(*b*) each producing an IR beam with a different linear profile (respectively, "wide angle IR emitter" 18(*a*) and "narrow angle IR emitter" 18(*b*)), a current driver 20(*a*), 20(*b*) for each IR emitter 18(*a*), 18(*b*), and control and processing circuitry 22 communicative with the imager 14, lens driver 16, and current drivers 20(*a*), 20(*b*).

While FIG. 1 shows an embodiment with only a pair of IR emitters 18(*a*), 18(*b*), other embodiments can features more than two IR emitters each producing an IR beam of a different linear profile, and which can be combined to produce an IR beam with a variable linear profile.

Figure 2:
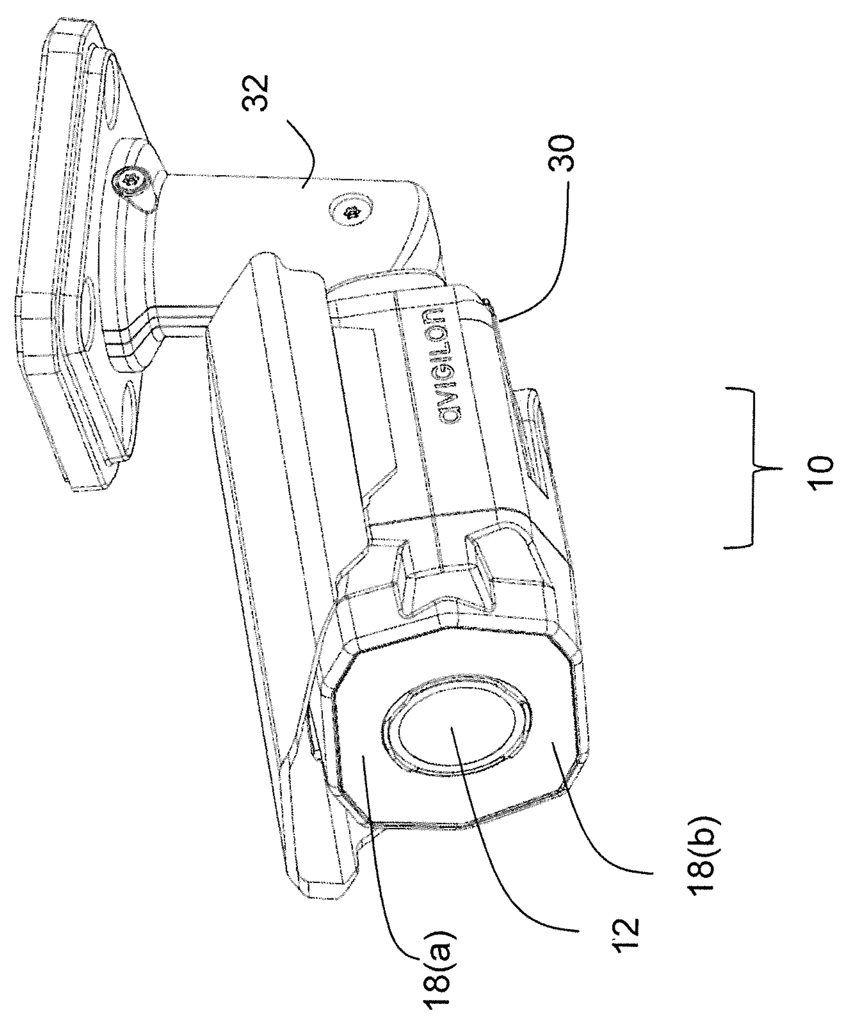
FIG. 2 is a perspective view of the imaging apparatus embodied as a security camera.

Referring to FIG. 2, the imaging apparatus 10 can be embodied as a security camera or surveillance camera. The security camera 10 has a housing 30 which houses the aforementioned major components of the imaging apparatus 10, and a movable mount 32 for mounting the camera 10 to a surface such as a ceiling. The zoom lens 12 is mounted at the front of the camera 10, and a printed circuit board ("PCB", not shown) is also mounted at the front of the camera 10 around the zoom lens 12; the wide angle IR emitter 18(*a*) and narrow angle IR emitter 18(*b*) are respectively mounted on this PCB and face the same direction as the zoom lens 12 and serve to illuminate the field of view of the zoom lens with infrared light. The IR emitters 18(*a*), 18(*b*) are aligned such that illumination pattern produced by each IR emitter 18(*a*), 18(*b*) is centred on the same location in the field of view, and more particularly, at the centre of the field of view of the zoom lens 12. The imaging apparatus 10 can be electrically coupled to a power source such as a nearby electrical outlet (not shown) and is configured with a maximum power rating that defines the total available power that can be sent to the IR emitters 18(*a*), 18(*b*).

Each IR emitter 18(*a*), 18(*b*) in this embodiment comprises a set of infrared emitting diodes (IRED) 34. Such IRED sets are known in the art; one suitable such IRED set comprises a pair of Osram SFH4715S IREDs. Each IR emitter 18(*a*), 18(*b*) also comprises a lenslet 36 for each IRED 34; the lenslet 36 is configured to shape the RED emission into an IR beam having an illumination pattern with a particular linear profile. In particular, the lenslets 36 for the wide angle IR emitter 18(*a*) will produce an IR beam with a linear profile that is relatively widely dispersed (hereinafter referred to as the "wide beam component"), and the lenslets 36 for the narrow angle IR emitter 18(*b*) will produce an IR beam with a linear profile that is relatively narrowly dispersed, i.e. (hereinafter referred to as the "narrow beam component"). Such lenslets are known in the art; one suitable such lenslet can be provided by Ledil.

The current drivers 20(*a*), 20(*b*) are designed to regulate the current delivered to the IR emitters 18(*a*), 18(*b*). The current drivers 20(*a*), 20(*b*) can be controlled to deliver all of the total available power to one or the other of the IR emitters 18(*a*), 18(*b*), or vary the power ratio between the two emitters 18(*a*), 18(*b*). Such current drivers are known in the art; one suitable such current driver is the AL8805 Buck LED Driver by On Semiconductor. The current drivers 20(*a*), 20(*b*) are each communicatively coupled to a respective general purpose input/output (GPIO) pin 38(*a*), 38(*b*) on a circuit board inside the housing which contains the processing circuitry 22 (otherwise known as main system on chip (SoC)) of the surveillance camera 10. The SoC 22 includes a processor and a memory (CPU) 40 having encoded thereon program code that is executed by the processor to operate the security camera 10. This program code includes instructions for sending a control signal from each GPIO pin 38(*a*), (*b*) to each current driver 20(*a*), 20(*b*) to produce the IR beam. As will be described in detail below, the program code also includes instructions for combining the wide and narrow beam components in a manner that produces a combined IR beam with a linear profile that is suitable for a particular focal length of the zoom lens 12.

The processing circuitry 22 also comprises an interface bus with pins 42, 44 that are communicatively coupled to the lens driver 16 and imager 14. The imager 14 is configured to capture light in the infrared spectrum, and can be for example, a digital sensor such as a complementary metal-oxide-semiconductor (CMOS) sensor. The specifications of the imager 14 and the zoom lens 12 can be selected based on an operator's requirements and performance expectations. Operation of zoom lenses and imaging sensors in a surveillance camera are well known in the art and thus the operation of the imager 14, lens driver 16 and zoom lens 12 are not described in further detail here.

Figure 3B:
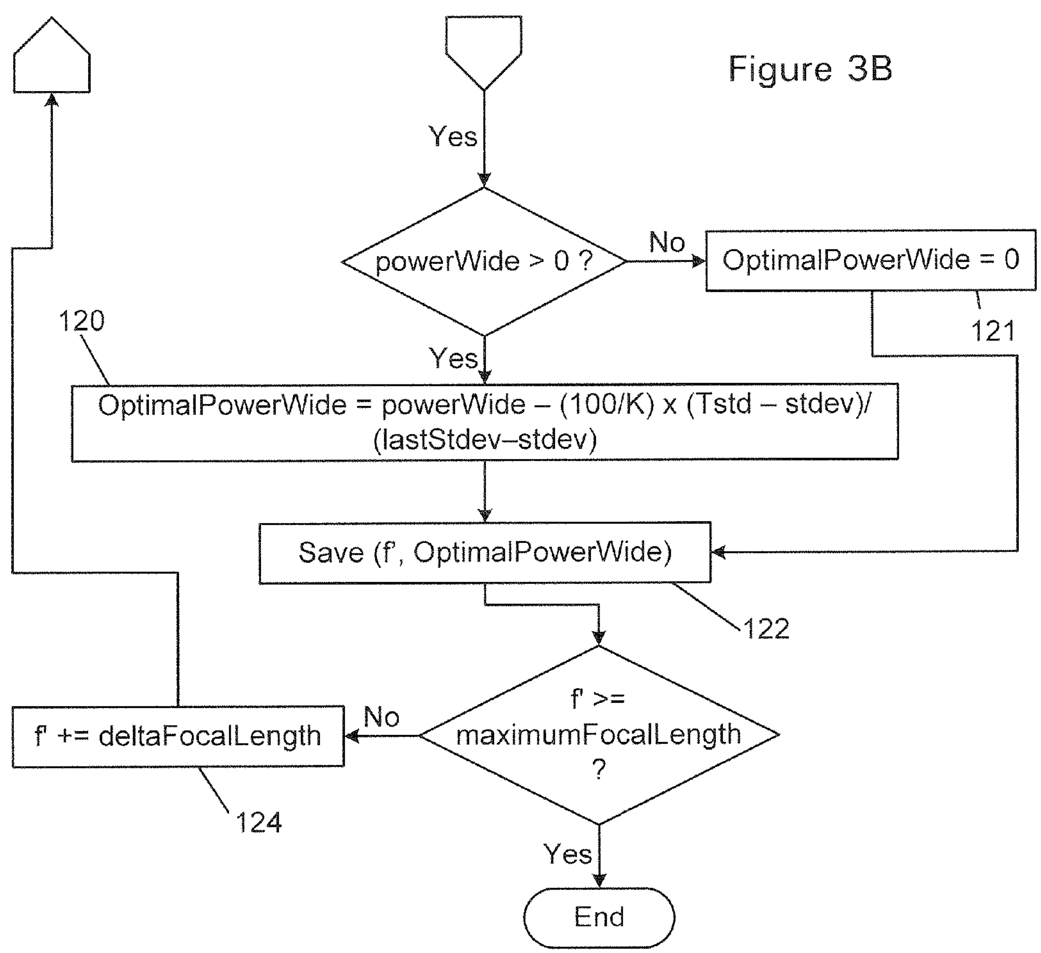

Referring now to FIGS. 3A and 3B, the program code stored on the memory of the CPU and executable by the processor of the CPU includes instructions for performing a method for generating an IR beam with a linear profile that varies with focal length of the zoom lens ("zoom adaptive IR beam"). More particularly, the program code when executed selects a power ratio of the wide beam component to the narrow beam component to produce an IR beam with a linear profile that suits a particular focal length of the zoom lens. The program code comprises the following steps:

(a) read lens driver 16 to determine current focal length of the zoom lens;

(b) read a beam profile-to-focal length map to determine the linear profile of the IR beam that is associated with the current focal length; and (c) send control signals to each current driver 20(*a*), 20(*b*) at the power ratio associated with the determined linear profile, to generate an IR beam having the determined linear profile.

The beam profile-to-focal length map is a database comprising the IR beam linear profile and associated power ratio for each focal length increment of the zoom lens. The IR beam linear profile and associated power ratio can be determined for each focal length increment by carrying out the following steps:

First, the security camera 10 captures two images with the zoom lens 12 at the shortest focal length $f$ (step 100). The first image ("img1") is captured using an IR beam with all of the available power sent to the wide angle IR emitter 18(*a*) and no power sent to the narrow angle IR emitter 18(*b*) ("W@100%, N@0%"); in other words, the power ratio of the wide beam component to the narrow beam component ("wide/narrow beam power ratio") of this IR beam is 100:0. The second image ("img2") is captured using an IR beam with a wide/narrow beam power ratio of 0:100 ("W@0%, N@100%"). The first image thus corresponds to the wide beam component emitted by the wide angle IR emitter 18(*a*), and the second image corresponds to the narrow beam component emitted by the narrow angle IR emitter 18(*b*). Then, the linear profiles of the first and second images ("LinearProfile(img1)", "LinearProfile(img2)") are determined by determining the IR irradiance I at each pixel P across the width of each image, wherein each image has an image width of n pixels. The linear profiles are stored in a database on the memory (step 102).

Then, a series of steps are carried out that determine a suitable wide/narrow beam power ratio of the IR beam for each focal length increment, starting at the shortest focal length $f$ ("minimumFocalLength") and advancing in selected increments $f'$ to the longest focal length. A suitable wide/narrow beam power ratio is one which produces an IR beam having the maximum IR power delivered to the field of view at focal length $f'$ and a linear profile that has a standard deviation that is below a target standard deviation. The target standard deviation can be empirically derived (step 104), and can be selected to produce an acceptably even distribution of IR intensity across the image width.

Starting at the shortest focal length $ff$ (step 106), the field of view is determined for each focal length increment $f'$. As the field of view decreases as a function of increasing focal length, the field of view FOV at a focal length increment $f'$ can be approximated by the following equation:

$$FOV_{f'}=[n(1-f/f')/2 \ldots n(1+f/f')/2]$$

Once the field of view at the focal length increment $f'$ has been determined, the linear profile for the narrow beam component $L_{N'1 \ldots n]}$ and wide beam component $L_{W'[1 \ldots n]}$ at this focal length is determined (step 108) and stored in the memory.

For each focal length increment $f'$, the linear profile of the combined IR beam at different wide/narrow beam power ratios is iteratively determined until a power ratio is found which produces an IR beam having a standard deviation that is smaller than the target standard deviation. This determination is performed in an iterative loop starting with a wide/narrow beam power ratio of 0:100 ("powerWide=0%, powerNarrow=0%") (step 110) and iterating through a selected number of power ratios of decreasing increments of the power to the narrow angle emitter. The increment intervals can be selected depending on the factors such as desired processing speed, and can for example be 20% resulting in six power ratios 0:100, 20:80, 40:60, 60:40, 80:20, and 100:0. The linear profile of the combined IR beam at each power ratio is determined by taking the weighted average $L_c$ of the wide and narrow beam linear profiles $L_{W'}$ and $L_{N'}$ at the selected power ratio (step 112). Then, the standard deviation of the linear profile of the combined IR beam is determined (step 114) and compared to the target standard deviation (step 116). If the determined standard deviation is not less that the target standard deviation and the selected power ratio is not 100:0, the next power ratio is selected (by reducing the narrow beam component power by 20% and increasing the wide beam component power by 20%) (step 118) and the method returns back to step 112 wherein the linear profile of the combined IR beam is calculated again at the next power ratio.

As noted above, the target standard deviation represents an acceptable distribution of the IR beam across the image width. By starting with a wide/narrow beam power ratio of 0:100 at the shortest focal length and reducing the power to the narrow beam component with each increasing increment of focal length until a power ratio is found with a standard deviation below the target standard deviation, the combined IR beam should have the maximum IR power (maximum irradiance) deliverable to the field of view of the camera for the available power ratio combinations, since that power ratio will provide the maximum possible power to the narrow beam component.

Steps 112 to 118 are repeated until a power ratio is found which produces a linear profile of the combined IR beam with a standard deviation that is less than the target standard deviation. Once this occurs and provided that the power ratio is not 100:0, an optimal power ratio for the combined IR beam is determined (step 120) by linearly interpolating for the target standard deviation according to the following equation:

$$OptimalPowerWide=powerWide-(100/k)\times(T_{std}-stddev)/(lastStddev-stddev)$$

wherein

OptimalPowerWide is the optimal power % of the wide beam component;

powerWide is the power % of the wide beam component at the power ratio that produces a standard deviation (stdDev) below the target standard deviation (the power % of the narrow beam component can be easily calculated as 100%−power % of the wide beam component);

$T_{std}$ is the target standard deviation; and lastStddev is the standard deviation at the power ratio immediately preceding the power ratio associated with stdDev.

If the power ratio is 0:100, then the optimal power ratio is deemed to be 0:100 and the linear interpolation step is not performed (Step 121).

Once the optimal power ratio is determined, this value along with the corresponding focal length f' is saved in the map (step 122), and the method advances to the next focal length increment *f*' (step 124) and the method returns back to step 106 to determine the optimal power ratio of the combined IR beam at the next focal length increment *f*'. Once the method has advanced through all the focal length increments, the beam profile-to-focal length map is produced representing the optimal power ratios for the combined IR beam at each focal length increment *f*'.

In an alternative embodiment, the beam profile-to-focal length map can be generated empirically by projecting multiple combinations of power ratios for the wide and narrow beam components at each focal length, and manually selecting the power ratio that produces an IR beam with a linear profile with an acceptable standard deviation and irradiance.

According to another embodiment (not shown), an IR illuminator can be provided with the same wide and narrow angle IR emitters 18(*a*), 18(*b*) as in embodiment shown in FIGS. 1 to 3B to produce an IR beam with a variable linear profile, but this IR illuminator does not form part of an imaging apparatus. This IR illuminator can, for example, be an external IR illuminator that is used in conjunction with an IR security camera.

As this IR illuminator is not part of an imaging apparatus, the processing circuitry of the IR illuminator does not necessarily need to include instructions for varying the IR beam's linear profile with the focal length of the imaging apparatus' zoom lens. Instead, the IR illuminator can be provided with a user interface which allows an operator to manually select a desired linear profile for the IR beam. Alternatively or additionally, the IR illuminator can be provided with a wireless communications means like Wi-Fi, or a communications port for connecting an Ethernet or other communications cable to an imaging apparatus, to allow the IR illuminator to communicate with the imaging apparatus. The processing circuitry of the IR illuminator or the connected imaging apparatus can be programmed with the beam profile-to-focal length map, as well as with program code which causes the IR illuminator to generate an IR beam with a linear profile that varies with the focal length of the imaging apparatus' zoom lens.

EXAMPLES

Figure 4:
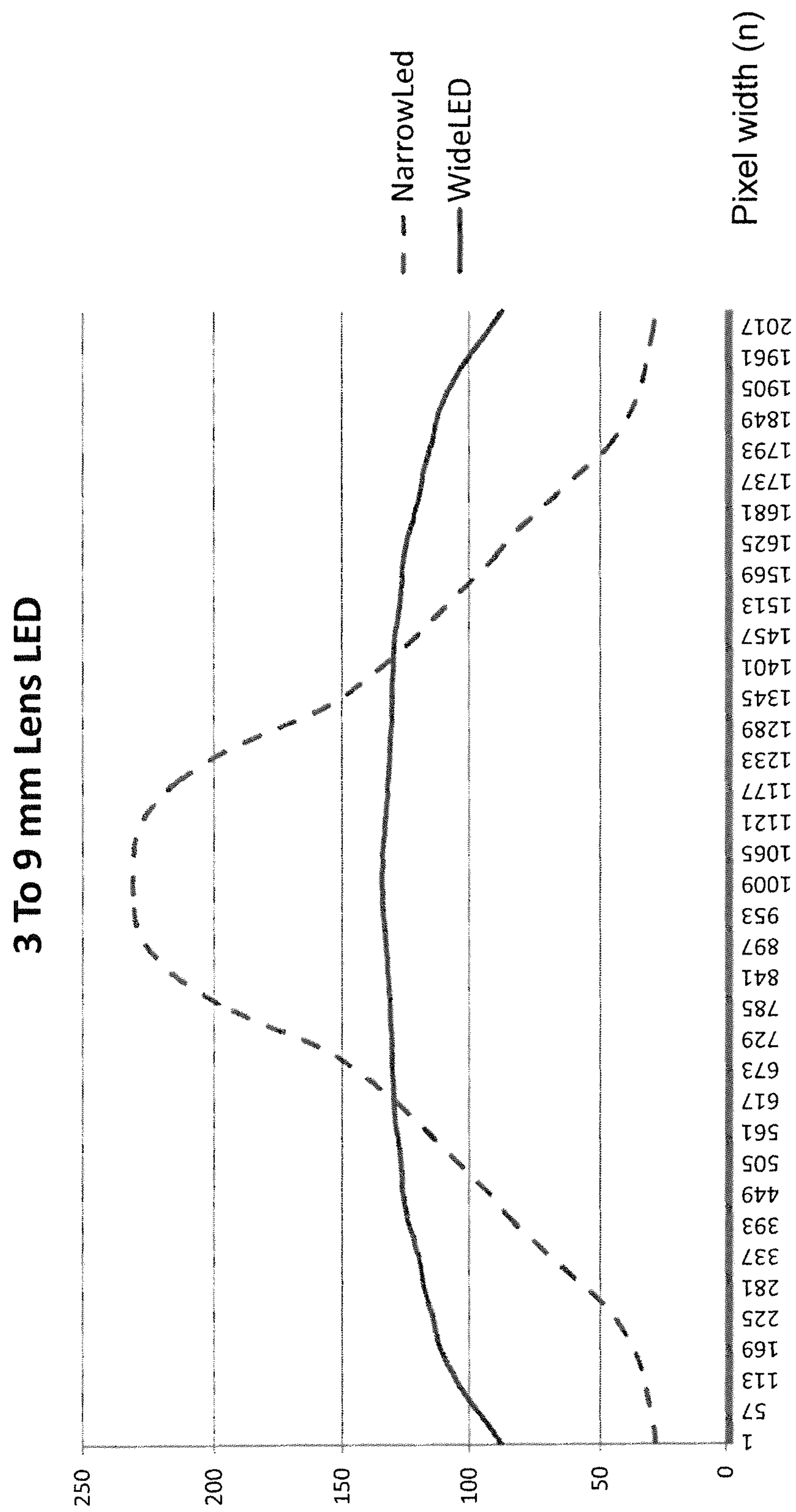
FIG. 4 is a graph of exemplary linear profiles of a wide angle LED set and a narrow angle LED set of the imaging apparatus at the shortest focal length of a 3 to 9 mm zoom lens.
Figure 5:
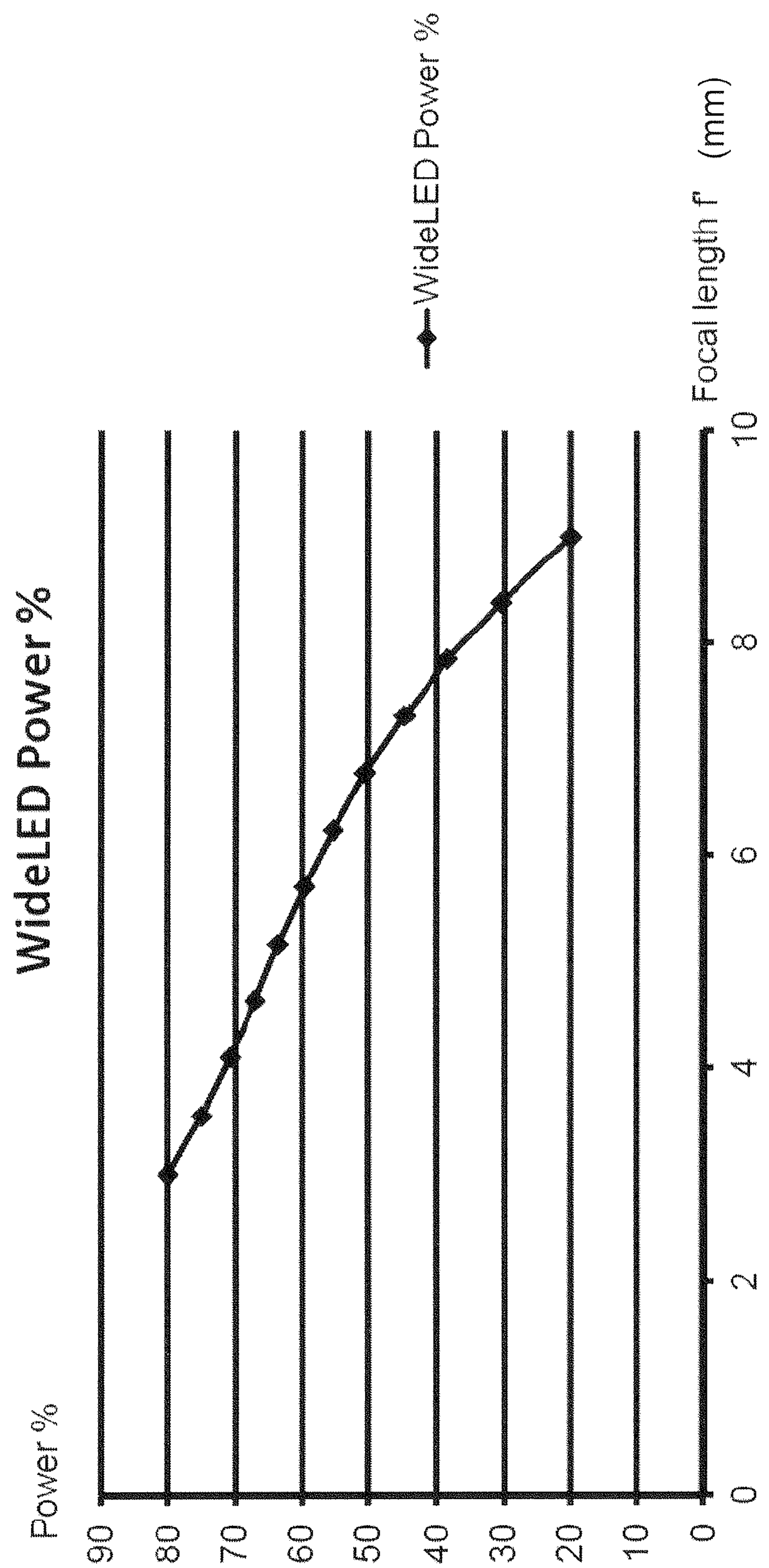
FIG. 5 is a graph of exemplary focal length to optimal power output of the wide angle LED set of an imaging apparatus having the linear profiles of the wide and narrow angle LED sets and zoom lens shown in FIG. 4.

Referring now to FIGS. 4 and 5, the linear profiles of the wide and narrow beam components are shown for a security camera having a 3 to 9 mm zoom lens, and image width n of 2015 pixels. The irradiance level at each pixel n is recorded as a pixel value of the image sensor, which in this case has 255 different pixel values for each pixel. It can be seen in FIG. 4 that the standard deviation of the narrow beam component is substantially higher than that of the wide beam component, with a luminous flux peaking in the centre of the image.

FIG. 5 shows a map of wide angle power settings of the IR beam for each focal length increment *f*'. Here it can be seen that over a focal length of 3 to 9 mm, that the power % of the wide beam component varies from 80% to 20%. This map can be used to determine the wide/narrow beam power ratio for the IR beam at each focal length increment *f*'.

While the present invention has been described herein by the preferred embodiments, it will be understood to those skilled in the art that various changes may be made and added to the invention. The changes and alternatives are considered within the spirit and scope of the present invention. For example, while this disclosure has been directed to IR imaging, the invention can be applied to imaging using other parts of the electromagnetic radiation spectrum, such as the visible light spectrum. In particular, a visible light illuminator can be provided which is comprised of two or more illuminator components that produce at least a wide beam component and a narrow beam component that can be combined to produce a combined visible light illumination beam of variable linear profile. More particularly, the linear profile of the illumination beam can be varied with focal length increment of a zoom lens of an imaging apparatus.

What is claimed is:

1. A method for generating an infrared (IR) beam for illuminating a scene to be imaged, the method comprising:

(a) providing at least two IR emitters, including a first IR emitter operable to emit a wide beam component of the IR beam, and a second IR emitter operable to emit a narrow beam component of the IR beam, wherein the wide beam component has a linear profile that has a lower standard deviation than a linear profile of the narrow beam component;

(b) determining a current focal length, and using a processor, automatically selecting a power ratio of power directed to the first IR emitter and power directed to the second IR emitter that produces the IR beam with a desired linear profile for the determined current focal length when the narrow beam component and wide beam component are combined, wherein the power ratio is selected from a beam profile-to-focal length map comprising a series of focal length increments and their corresponding power ratios that produce an IR beam with the desired linear profile; and (c) producing the IR beam by directing power to the first and second IR emitters at the selected power ratio to generate the wide and narrow beam components, and combining the generated wide and narrow beam components.

2. A method as claimed in claim 1 wherein the generated wide and narrow beam components are combined by directing the centres of the wide and narrow beam components on the same location in the scene.

3. A method as claimed in claim 2 wherein the desired linear profile of the IR beam has a standard deviation that is less than or equal to a target standard deviation.

4. A method as claimed in claim 3 further comprising imaging the scene at a selected focal length, wherein the selected focal length has an associated field of view, and the desired linear profile for the selected focal length has a standard deviation that is less than or equal to the target standard deviation and a highest available irradiance within the field of view.

5. A method as claimed in claim 4 wherein the highest available irradiance is the power ratio having the highest proportion of power directed to second IR emitter and which produces an IR beam with a standard deviation less than or equal to the target standard deviation.

6. A method as claimed in claim 5 further comprising imaging the scene at different focal lengths each having a respective different field of view, and producing an IR beam with a desired linear profile corresponding to each different focal length, wherein each desired linear profile has a standard deviation that is less than or equal to the target standard deviation and the highest available irradiance for the field of view associated with the corresponding focal length.

7. A method as claimed in claim 6 wherein the imaging is performed by an imaging apparatus having a zoom lens with variable focal lengths, and the method comprises determining a current focal length of the zoom lens, selecting the desired linear profile corresponding to the current focal length, producing an IR beam at the desired focal length, and imaging a scene illuminated by the IR beam at the current focal length.

8. An apparatus for illuminating a scene to be imaged with infrared (IR) radiation, comprising:

(a) at least two IR emitters, including a first IR emitter operable to emit a wide beam component of the IR beam, and a second IR emitter operable to emit a narrow beam component of the IR beam, wherein the wide beam component has a linear profile that has a lower standard deviation than a linear profile of the narrow beam component;

(b) at least two current drivers, including a first current driver coupled to the first IR emitter, and a second current driver coupled to the second IR emitter; and (c) processing circuitry communicative with the current drivers to instruct each current driver to deliver a selected amount of power to the coupled IR emitter, and comprising a processor and a memory having encoded thereon:

(i) a beam profile-to-focal length map comprising a series of focal length increments and their corresponding power ratios, wherein each power ratio is a ratio of power directed to the first IR emitter and power directed to the second IR emitter that produces an IR beam with a desired linear profile for the corresponding focal length increment when the narrow beam component and wide beam component are combined; and (ii) program code executable by the processor to select a power ratio for a determined current focal length by selecting from the beam profile-to-focal length map the power ratio corresponding to the focal length increment matching the determined current focal length: and control the current drivers to direct power to the first and second IR emitters at the selected power ratio to generate the wide and narrow beam components and combine the generated wide and narrow beam components.

9. An apparatus as claimed in claim 8 wherein the first and second IR emitters are aligned such that the wide and narrow beam components are directed at the same location in the scene.

10. An apparatus as claimed in claim 9 further comprising an imager communicative with the processing circuitry, a zoom lens having variable focal lengths and being optically coupled to the imager, and a lens driver communicative with the zoom lens and the processing circuitry.

11. An apparatus as claimed in claim 10 wherein the memory further comprises a beam profile-to-focal length map comprising a series of focal length increments of the zoom lens and their corresponding desired linear profiles.

12. A method for generating a beam profile-to-focal length map for use in an apparatus that illuminates a scene with an infrared (IR) beam composed of a wide beam component and a narrow beam component, wherein the apparatus comprises at least a first IR emitter operable to emit the wide beam component and a second IR emitter operable to emit the narrow beam component, and wherein the wide beam component has a linear profile that has a lower standard deviation than a linear profile of the narrow beam component;

the method comprising:

(a) for each focal length increment in a group of focal length increments, determining a suitable wide beam-to-narrow beam power ratio of power directed to the first IR emitter and power directed to the second IR emitter that produces an IR beam with a desired linear profile for the focal length increment when the narrow beam component and wide beam component are combined; and (b) storing the determined suitable wide-beam-to-narrow-beam power ratio and corresponding focal length increment in a database readable by the apparatus.

13. A method as claimed in claim 12 wherein the step of determining the suitable wide beam-to-narrow beam power ratio for the focal length increment comprises determining a power ratio which produces an IR beam having a maximum IR power delivered to a field of view at the focal length increment and a linear profile that has a standard deviation that is below a target standard deviation.

14. A method as claimed in claim 13 wherein determining a wide beam-to-narrow beam power ratio which produces an IR beam having the maximum IR power comprises performing an iterative loop starting with a low wide-beam-to-narrow beam power ratio and iterating through a selected number of power ratio increments of decreasing increments of power to the second IR emitter, then selecting the lowest power ratio increment that produces a linear profile with a standard deviation that is less the target standard deviation.

15. A method as claimed in claim 13 wherein after the lowest power ratio increment has been selected, linearly interpolating for an optimal power ratio, and using the optimal power ratio as the suitable power ratio for the focal length increment in the database.

16. An apparatus for illuminating a scene to be imaged with infrared (IR) radiation, comprising:

(a) at least two IR emitters, including a first IR emitter operable to emit a wide beam component of the IR beam, and a second IR emitter operable to emit a narrow beam component of the IR beam, wherein the wide beam component has a linear profile that has a lower standard deviation than a linear profile of the narrow beam component;

(b) at least two current drivers, including a first current driver coupled to the first IR emitter, and a second current driver coupled to the second IR emitter; and (c) processing circuitry communicative with the current drivers to instruct each current driver to deliver a selected amount of power to the coupled IR emitter, and comprising a processor and a memory having encoded thereon program code for generating a beam profile-to-focal length map, and for using the map to instruct the IR emitters to produce an IR beam with a suitable wide beam-to-narrow beam power ratio of power directed to the first IR emitter and power directed to the second IR emitter, wherein the program code for generating the map comprises:

(i) for each focal length increment in a group of focal length increments, determining a wide beam-to-narrow beam power ratio that produces an IR beam with a desired linear profile for the focal length increment when the narrow beam component and wide beam component are combined and selecting this determined power ratio as the suitable wide beam-to-narrow beam power ratio; and (ii) storing the suitable wide beam-to-narrow beam power ratio and corresponding focal length increment in a database readable by the processing circuitry.

17. An apparatus as claimed in claim 16 wherein program code for determining the suitable wide beam-to-narrow beam power ratio for the focal length increment comprises determining a power ratio which produces an IR beam having a maximum IR power delivered to a field of view at the focal length increment and a linear profile that has a standard deviation that is below a target standard deviation.

18. An apparatus as claimed in claim 17 wherein the program code for determining a wide beam-to-narrow beam power ratio which produces an IR beam having the maximum IR power comprises performing an iterative loop starting with a low wide-beam-to-narrow beam power ratio and iterating through a selected number of power ratio increments of decreasing increments of power to the second IR emitter, then selecting the lowest power ratio increment that produces a linear profile with a standard deviation that is less the target standard deviation.

19. An apparatus as claimed in claim 18 wherein after the lowest power ratio increment has been selected, linearly interpolating for an optimal power ratio, and using the optimal power ratio as the suitable power ratio for the focal length increment in the database.

* * * * *

UNITED STATES PATENT AND TRADEMARK OFFICE
CERTIFICATE OF CORRECTION

PATENT NO. : 8,946,636 B2
APPLICATION NO. : 13/752291
DATED : February 3, 2015
INVENTOR(S) : Afrooze et al.

It is certified that error appears in the above-identified patent and that said Letters Patent is hereby corrected as shown below:

In the Claims:

Claim 8: Column 9, line 56, "length:" should read -- length; --

Signed and Sealed this
Seventeenth Day of May, 2016

Michelle K. Lee

Michelle K. Lee
*Director of the United States Patent and Trademark Office*

UNITED STATES PATENT AND TRADEMARK OFFICE

CERTIFICATE OF CORRECTION

PATENT NO. : 8,946,636 B2
APPLICATION NO. : 13/752291
DATED : February 3, 2015
INVENTOR(S) : Afrooze et al.

It is certified that error appears in the above-identified patent and that said Letters Patent is hereby corrected as shown below:

In the Specification:

Column 6, line 11, "length f*f*" should read -- length *f* --

In the Claims:

Claim 8: Column 9, line 56, "length:" should read -- length; --

This certificate supersedes the Certificate of Correction issued May 17, 2016.

Signed and Sealed this
Twenty-eighth Day of June, 2016

Michelle K. Lee
*Director of the United States Patent and Trademark Office*